United States Patent
Rukovena

[11] Patent Number: 6,007,915
[45] Date of Patent: Dec. 28, 1999

[54] SHAPED PACKING ELEMENT

[75] Inventor: Frank Rukovena, Tallmadge, Ohio

[73] Assignee: Norton Chemical Process Products Corporation, Stow, Ohio

[21] Appl. No.: 09/158,931

[22] Filed: Sep. 22, 1998

[51] Int. Cl.[6] .............................. D07G 3/00; B01D 47/16
[52] U.S. Cl. .................. 428/397; 261/94; 261/DIG. 72
[58] Field of Search .................. 428/397; 206/814; 261/DIG. 72, 94; 422/211

[56] References Cited

U.S. PATENT DOCUMENTS

| | | | |
|---|---|---|---|
| 4,511,519 | 4/1985 | Hsia | 261/94 |
| 5,688,444 | 11/1997 | Koshy | 261/DIG. 72 |
| 5,690,819 | 11/1997 | Chianh | 261/DIG. 72 |
| 5,714,097 | 2/1998 | St. Louis et al. | 261/DIG. 72 |
| 5,730,916 | 3/1998 | Kunzel et al. | 261/94 |
| 5,779,886 | 7/1998 | Couture | 261/DIG. 72 |
| 5,882,772 | 3/1999 | Schultes | 261/DIG. 72 |

*Primary Examiner*—Newton Edwards
*Attorney, Agent, or Firm*—David Bennett

[57] ABSTRACT

A packing element with a plurality of symmetrically disposed subdivisions within a cylindrical body member provides a very strong, high temperature and corrosive media resistant structure with a large surface area. The elements are of great utility as dumped packing elements in mass transfer applications.

8 Claims, 2 Drawing Sheets

SHAPED PACKING ELEMENT

BACKGROUND OF THE INVENTION

This invention relates to shaped packing elements and particularly dumped packing elements shaped from extrudable materials such as plastics and ceramic slurries.

Such elements are used in reactors where liquids and gases are contacted so as to bring about a reaction, heat transfer, solution or dissolution operations by intimately contacting two flowing fluids. As a consequence they have shapes designed to maximize surface area while retaining dimensional stability such they do not collapse or become crushed during use. In addition, where the environment in which the elements are required to operate is corrosive and/or at an elevated temperature, it is desirable to form the elements from a ceramic material. Finally it is desirable to have a structure that is easily produced to a standard design in large volumes.

The present invention provides such a shaped packing element with excellent strength and surface area properties that is readily manufactured by a simple extrusion process.

DESCRIPTION OF THE INVENTION

The present invention provides an extrudable packing element comprising a cylindrical body member with a consistent cross-section which comprises a plurality of chord members within the body member wherein each end of a chord member is contiguous with an end of another chord member, and a plurality of radial septa members extending from the axis of the cylinder to at least as far as the mid-point of a chord member.

It is understood that, for the sake of simplicity, the internal structure of the elements according to the invention, which is uniform along the axial length of the element, is described in terms of the features that appear in a cross-section through the element at the midpoint of the axial length. Thus an internal member that divides off a segment of the internal surface of the cylindrical body member is referred to herein as a "chord member" even though the term "chord" is properly only applied to a line within a circle that does not pass through the center.

The chord members are preferably of equal length since this leads to greater symmetry and uniformity in the dimensions of the through passages defined by the structures within the cylindrical body member.

The element can have any suitable number of chord members from three, (essential if the "contiguous" condition is to be met) to preferably no more than eighteen. In general however a number from four to ten, and particularly six, is preferred. In the most preferred structure the six chord members are grouped in two subgroups of three, each subgroup forming an equilateral triangle with one triangle displaced by 60° around the circumference of the cylindrical body member from the other.

The number of radial septa members is determined by the number of chord members and will be an equal number. Thus, for example, with the preferred six chord members there are also six radial septa members.

In preferred structures additional reinforcing members are provided between the inner surface of the cylindrical body member and extending along a radius of the cylindrical body member to at least the point of intersection of two chord members. Typically the additional reinforcing members do not extend as far as the axis of the structure. As will be appreciated such positioning is only possible where the chords are in two or three groups with equal numbers, (three or four), in each group and with the structures formed by the groups, (triangles, or squares), overlapping and rotationally displaced around the axis of the cylindrical body member.

The structures of the invention are very effective in that they provide a very large number of intersection points at which liquids flowing across the various surfaces meet and are obliged to mix and merge before again subdividing, thus promoting homogeneity.

A further advantage lies in the mutual reinforcement of the members. A cylindrical body member without the internal structures would have a much reduced resistance to compressive forces. The chord members, particularly the most preferred group of six, provides significant added internal strength and this is further enhanced by the radial septa members which further brace the chord members against deforming movements. Finally the added reinforcing members provide a final level of reinforcement for the cylindrical body member.

When the chord members are grouped in two groups of three, as in the most preferred structures, the various reinforcing members divide the internal volume of the cylindrical body member into roughly equal sub-divisions. Thus, in addition to strengthening the cylindrical body element, the surface area is significantly increased and the degree of impedance to gas flow through the element is minimized and equalized such that each passage through the element has an equal gas flow.

The cylindrical elements according to the invention are preferably provided with curved end surfaces to inhibit nesting of the elements when dumped into a tower. The curvature of each end surface can be the same or different, for example one end can be convex while the other is concave or both can be concave or both convex. Preferably however the radius of curvature of each curved end is the same. This configuration is particularly advantageous since, when the product is extruded and the extrudate is cut to form elements, a single arcuate cut forms a concave end on a first element and a convex end on a second element from which the second is thereby separated. Thus with just two cutting blades or even with just one reversible blade, it is possible to produce all possible combinations of convex and concave combinations.

The elements can be shaped by a molding process but they are preferably made by an extrusion process using a suitably designed die. The product of the extrusion is a long cylinder with the same internal structure throughout. A knife, preferably with a curved blade, severs the long cylinder into elements of the desired length with curved ends if the curved blade is used. The elements are then fired in a kiln to produce the finished elements.

DRAWINGS

DETAILED DESCRIPTION OF THE INVENTION

The invention is now further described with reference to the Drawings which are intended to illustrate the invention but are not to be understood as implying any essential limitations on the scope of the invention.

Figure 1:
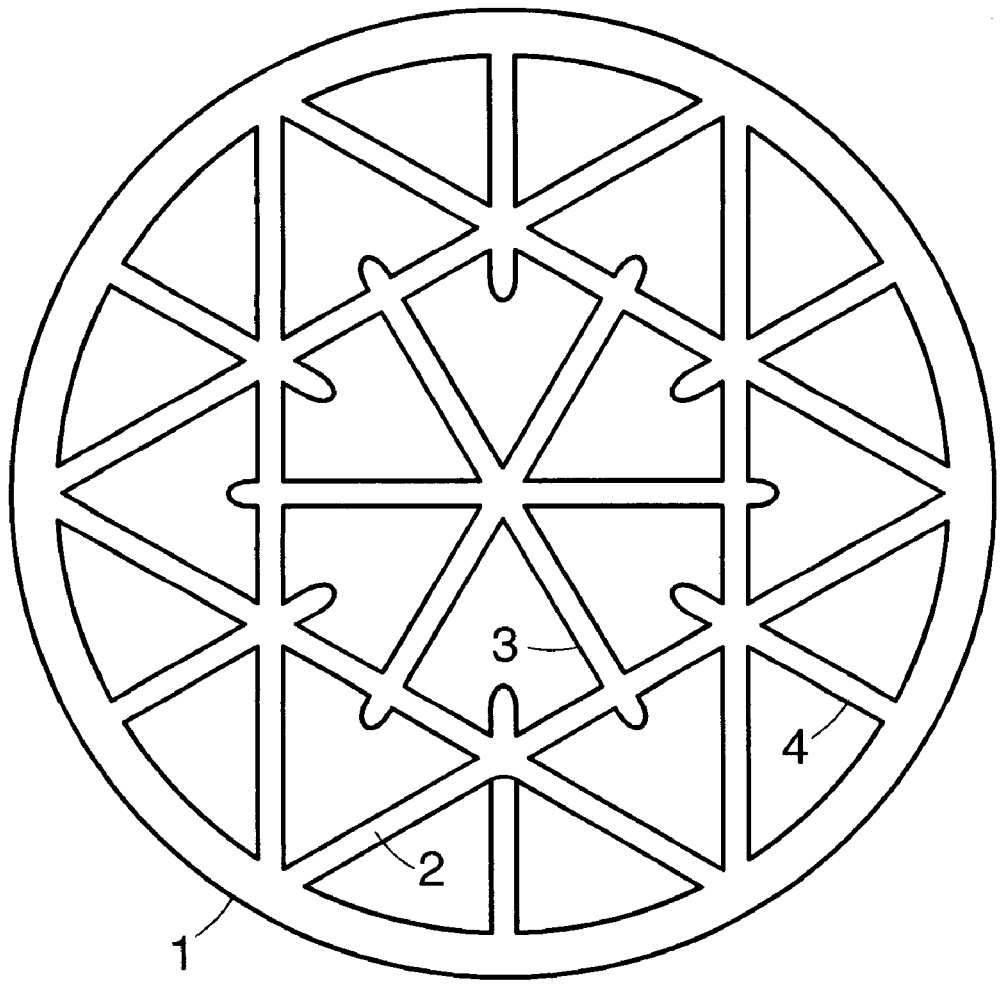
FIG. 1 is a cross-section normal to the axis of a preferred element according to the invention.

In FIG. 1, a cylindrical body member, 1, is provided with six identical chord member, 2, arranged in two equilateral triangles, the apexes of one being displaced around the circumference of the body member by 60° from the apexes of the second. Radial septa members, 3, radiate from the axis to the midpoints of the chord members and reinforcing members, 4, connect the interior surface of the cylindrical body member with the intersections of the chord members.

In FIG. 2, which shows a side view of the element illustrated in FIG. 1, the configuration of the ends of the element are shown. The ends are respectively straight, (7 in (a)); convex and concave curved, (5 and 6 respectively in (b)); double convex, (5 in (c)); and irregular, (8 in (d)).

Figure 2D:
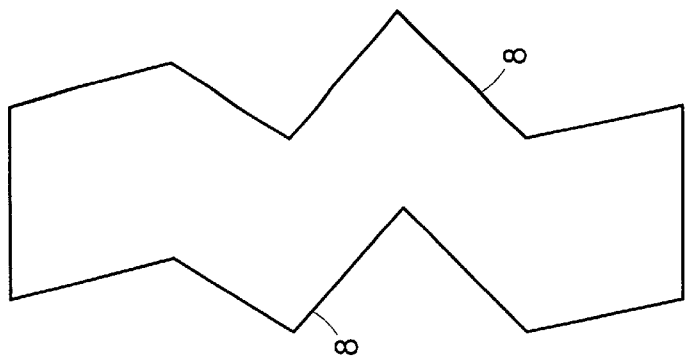
FIG. 2 illustrates four optional side views, (a, b, c and d), of the element shown in FIG. 1 with the ends given curved or irregular surfaces.
Figure 2C:
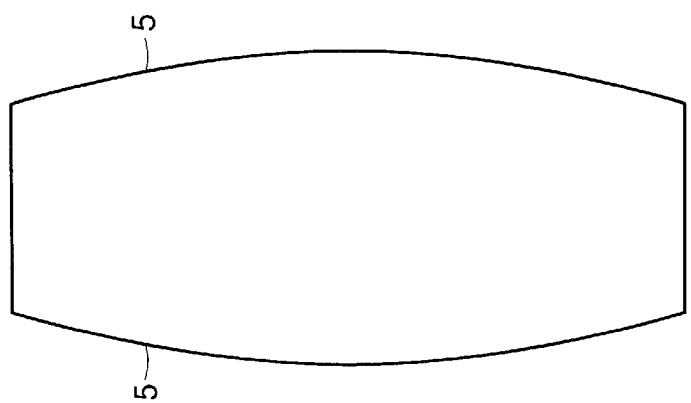
Figure 2B:
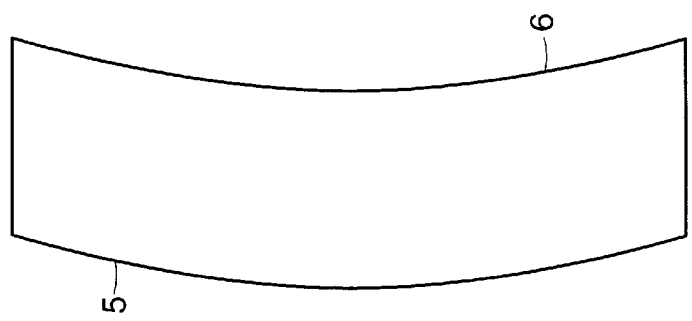
Figure 2A:
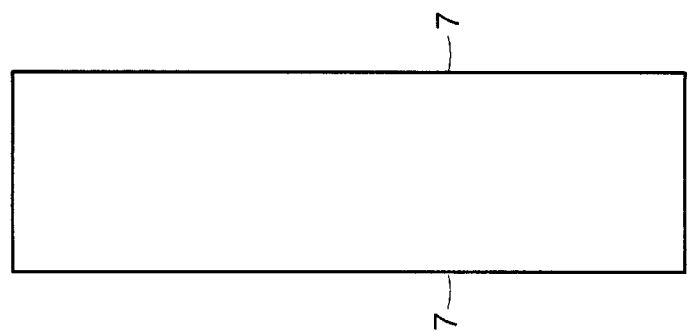

The elements according to the invention configured as illustrated in FIGS. 1 and 2b and fabricated from ceramic materials were evaluated for mass transfer efficiency, ($k_g a$), packing factor; weight in pounds per cubic foot, (which indicates the relative weights of installations of the elements); and pieces per cubic foot. In each case the values were measured in terms of value by comparison with an industry standard, a 2" ceramic saddle sold by Norton Chemical Process Products Corporation under the registered trademark "Intalox" which was arbitrarily given the value "1.00". The other comparison basis was a 3" ceramic Intalox® saddle.

The element according to the invention had a diameter of 4.25" and a wall thickness of from 0.25" (cylindrical body member) to 0.125", (radial septa). The axial length of the elements was 1.25".

The performance parameters of the three elements was as follows:

|  | Mass Transfer Efficiency | Packing Factor Ratio | Weight Ratio (lbs/ft$^3$) | Pieces/ft$^3$ Ratio |
| --- | --- | --- | --- | --- |
| 2" Saddles | 1.00 | 1.00 | 1.00 | 1.00 |
| 3" Saddles | 0.71 | 0.66 | 0.94 | 0.21 |
| Invention | 1.14 | 0.91 | 1.04 | 0.22 |

From the above data it is clear that the elements according to the invention are 14% more efficient than the 2" saddles and 60% more efficient than the 3" inch saddles. In addition fewer elements are used per cubic foot than the 2" saddles and about the same as with the 3" saddles and a lower pressure drop than for the 2" saddles.

What is claimed is:

1. A shaped packing element comprising a cylindrical body member having an axial length with a uniform cross-section between end portions thereof and comprising a plurality of chord members within the body member wherein each end of a chord member is contiguous with an end of another chord member, and a plurality of radial septa members extending from the axis of the cylinder to at least as far as the mid-point of a chord member.

2. A packing element according to claim 1 having six identical chord members arranged in two equilateral triangles with the apexes of the first triangle displaced around the circumference of the cylindrical body member by 60° from the adjacent apexes of the second.

3. A packing element according to claim 2 having six radial septa members.

4. A packing element according to claim 2 having six reinforcing members connecting the interior of the cylindrical body member with the intersections of two chord members.

5. A packing element according to claim 1 formed from a ceramic material.

6. A packing element according to claim 1 formed from a plastic material.

7. A packing element according to claim 1 formed from a metal.

8. A packing element according to claim 1 formed from carbon.

* * * * *